(12) United States Patent
Campau

(10) Patent No.: US 8,425,168 B2
(45) Date of Patent: Apr. 23, 2013

(54) LOCKING THREADED FASTENER

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 359 days.

(21) Appl. No.: 12/880,580

(22) Filed: Sep. 13, 2010

(65) Prior Publication Data

US 2012/0063863 A1  Mar. 15, 2012

(51) Int. Cl.
*F16B 37/12* (2006.01)

(52) U.S. Cl.
USPC .................................... 411/251; 411/262

(58) Field of Classification Search .......... 411/251, 411/252, 248, 249, 262, 250, 929, 929.1
See application file for complete search history.

(56) References Cited

U.S. PATENT DOCUMENTS

| | | | |
|---|---|---|---|
| 152,249 A | 6/1874 | Penfield | |
| 422,027 A | 2/1890 | Marshall | |
| 900,589 A | 10/1908 | Ratcliffe | |
| 960,349 A * | 6/1910 | Lafleur | 411/248 |
| 988,911 A | 4/1911 | Terry | |
| 1,081,965 A | 12/1913 | Kester | |
| 1,179,446 A | 4/1916 | Mennie | |
| 1,267,656 A | 5/1918 | Goserud | |
| 1,440,324 A | 12/1922 | Whitaker | |
| 1,630,958 A | 5/1927 | Mauch | |
| 1,830,919 A * | 11/1931 | Sundh | 411/262 |
| 1,830,920 A * | 11/1931 | Sundh | 411/262 |
| 1,929,169 A * | 10/1933 | Hall | 411/262 |
| 2,233,889 A * | 3/1941 | Hood | 411/251 |
| 2,367,929 A * | 1/1945 | Colman | 411/249 |
| 2,562,621 A | 7/1951 | Larson | |
| 2,587,560 A | 2/1952 | Widmer | |
| 2,823,725 A | 2/1958 | Trinca | |
| 3,391,720 A | 7/1968 | Morse | |
| 3,565,149 A | 2/1971 | Wetzel | |
| 3,589,423 A | 6/1971 | Metz | |

(Continued)

FOREIGN PATENT DOCUMENTS

| | | |
|---|---|---|
| AT | 375452 | 8/1984 |
| EP | 1760334 | 3/2007 |

(Continued)

OTHER PUBLICATIONS

International Search Report and Written Opinion for International Application No. PCT/US2012/037183, mailed Aug. 6, 2012.

(Continued)

*Primary Examiner* — Gary Estremsky
(74) *Attorney, Agent, or Firm* — Warner Norcross & Judd LLP

(57) ABSTRACT

A self-locking threaded fastener that can be driven using conventional driving tools. The threaded fastener includes a fastener body and a locking band. The body includes a) a threaded portion and an unthreaded portion and b) an aperture extending radially from the unthreaded portion. The locking band includes a curved portion within the unthreaded portion of the fastener body and a tang extending into the aperture to limit angular movement of the tang with respect to the body. The curved portion terminates at an end having a range of radial movement with respect to the fastener body. When the threaded fastener is turned in a loosening direction, the locking band inhibit loosening of the threaded fastener.

10 Claims, 7 Drawing Sheets

U.S. PATENT DOCUMENTS

| | | | |
|---|---|---|---|
| 3,701,372 A | 10/1972 | Breed | |
| 4,069,855 A | 1/1978 | Petroshanoff | |
| 4,334,438 A * | 6/1982 | Mochida | 74/502.4 |
| 4,983,085 A | 1/1991 | Gray | |
| 5,449,259 A * | 9/1995 | Clohessey | 411/262 |
| 5,529,348 A | 6/1996 | Wasserman et al. | |
| 6,015,251 A | 1/2000 | Chung | |
| 8,016,532 B2 * | 9/2011 | Park | 411/251 |
| 2009/0095359 A1 | 4/2009 | Campau | |
| 2009/0097940 A1 | 4/2009 | Campau | |
| 2010/0266364 A1 | 10/2010 | Campau | |

FOREIGN PATENT DOCUMENTS

| | | |
|---|---|---|
| FR | 1377030 | 10/1964 |
| FR | 2544030 | 10/1984 |
| GB | 04780 | 0/1909 |
| GB | 221456 | 9/1924 |

OTHER PUBLICATIONS

International Search Report and Written Opinion for International Application No. PCT/US2011/049254, mailed Oct. 28, 2011.
International Search Report and Written Opinion for International Application No. PCT/US2008/076155, mailed Dec. 19, 2008.
International Search Report and Written Opinion for International Application No. PCT/US2010/026196, mailed May 31, 2010.
United States Statutory Invention Registration No. H1588, published Sep. 3, 1996, entitled "Helical Spring Fastener".

* cited by examiner

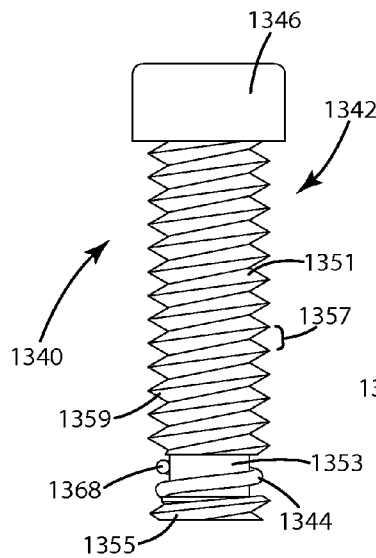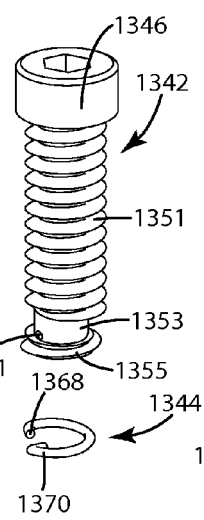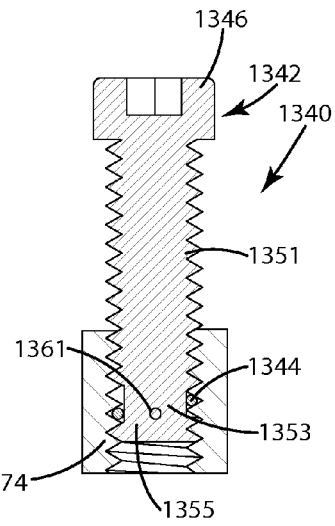
Fig. 19        Fig. 20        Fig. 21
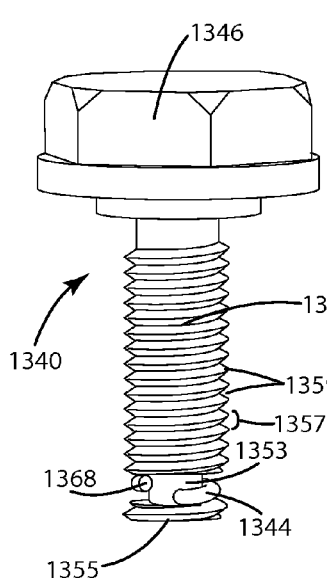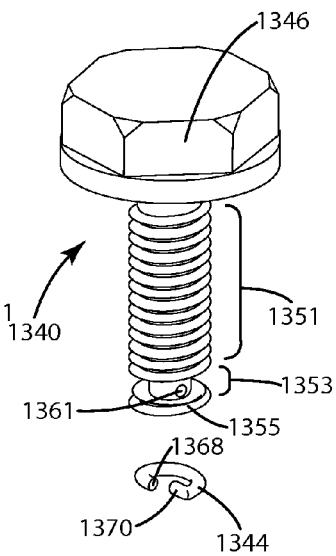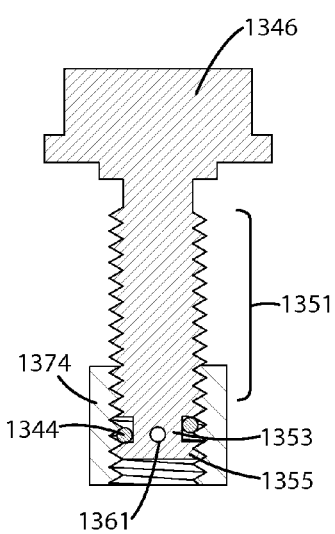
Fig. 22        Fig. 23        Fig. 24

LOCKING THREADED FASTENER

BACKGROUND OF THE INVENTION

The present invention relates to locking threaded fasteners, and more particularly to such fasteners that can be driven using conventional driving tools.

Many locking fasteners have been developed to increase the reliability of threaded joints. For example, several known locking fasteners include split, star and spring locking washers, ramped washers, thread adhesives, wire locking pins, cotter pins, external bracing, ratchet devices, jam nuts and polymer thread patches. Other known locking fasteners include lock nuts with nylon or metal inserts, distorted thread profiles and/or oval female thread diameters. These locking fasteners are widely used in applications involving cyclic loading, vibration, thermal expansions and flexing of one or more joint members. They can be used across all industries, but are essential in demanding fields such as surgical implants and fixation systems, automotive, aerospace, racing, off-road and construction equipment, turbine and power generation, electrical connections and any equipment subject to vibration and thermal cycling.

Some of these locking fasteners, for example lock washers, are widely used but have been shown to be unreliable with prolonged exposure to cyclic loads and vibration. Other locking fasteners, while effective, can be comparatively expensive. For example, Nordlock® ramped washers consist of a stacked pair of hardened steel washers with serrations on the joint face and interlocking ramps to prevent the bolt from backing out. While effective, the ramp washers are comparatively expensive and two sets must be used if both a bolt and a nut are used.

Thread adhesives, such as those produced by Loctite Corporation, are effective when applied in a controlled environment to properly prepared surfaces. However, thread adhesives are best suited for permanent joints where frequent removal and reinstallation are not required. In addition, wire locking and cotter pins are safety measures which prevent fasteners from separating from the joint but do not prevent the fastener from loosening. External bracing is a specialized solution, and is often customized to a particular application. Like thread adhesives, wire locking, cotter pinning and external bracing are inconvenient with respect to removal and reinstallation.

Fasteners with ratchet devices having detents and pawl arrangements that lock the nut at fixed angular positions on the male thread are available for some applications, but are complex and not widely used. In addition, jam nuts are sometimes used to back up a primary nut. However, jam nuts have the effect of reducing the tension between the bolt and the primary nut which may adversely affect the joint strength.

Prevailing torque locking fasteners create a prevailing torque which acts both during installation and removal. Prevailing torque inhibits self-loosening, but it slows installation and requires specialized tools for installation because the fastener cannot easily be turned by hand. Prevailing torque must also be accounted for when setting joint torque specifications. Since prevailing torque can vary widely and diminish with reuse, maximum joint torque specifications must be de-rated to prevent applying too much joint torque if using a low prevailing torque fastener such as a reused fastener. Prevailing torque is created through thread interference, which increases friction. Wear occurs each time the fastener is used and reused, which reduces the prevailing torque. Distorted threads and oval female threads also have limitations because they can damage mating threads, making them unsuitable for use in frequently serviced equipment, such as race cars, aircraft and heavy equipment, for example. Galling of stainless steel fasteners can occur when using and reusing prevailing torque fasteners.

While the above fasteners can be effective, there is an ever continuing need for fasteners with improved effectiveness and cost efficiency. For example, several particularly effective self-locking threaded fasteners are disclosed in U.S. application Ser. No. 11/955,736, filed Dec. 13, 2007 and entitled "Locking Threaded Connection," and U.S. application Ser. No. 12/425,711, filed Apr. 17, 2009 and entitled "Locking Threaded Fastener," which are hereby incorporated by reference in their entireties. These applications disclose locking fasteners having an increased holding power while simultaneously overcoming many of the limitations discussed above. The disclosed locking fasteners can include a helical coil locking element, formed from round wire, providing continuous one-way torque and acting to prevent loosening of the nut but having no effect on installation torque. The locking element, located in a counterbored pocket in the nut, mates with and nests in the male threads and operates by gripping the male thread tightly when a loosening torque is applied to the joint. No thread interference friction is created. Since there is no increase in thread friction, there is no significant wear and the nut can be removed and reused without loss of holding power. Since there is no installation prevailing torque, the joint torque specification does not have to be reduced to account for a range of prevailing torques.

The unique, continuous one-way torque characteristic provides locking at any angular position of the nut on the male thread. Under cyclic loading, this characteristic allows the nut to resist loosening torque while in some applications the nut actually tightens under each half cycle of torque in the tightening direction. By contrast, standard prevailing torque locknuts resist loosening torque but cannot re-establish tightness in response to cyclic loading. However, the helical locking element is anchored to the nut at one end and free on the other end. It is installed in the nut such that as the male thread is engaged, the coil expands so that the male thread can slip relative to the coil. If a loosening torque is applied between the nut and male thread, friction between the coil and male thread causes the coil to tighten its grip on the thread under loosening torque.

In order to prevent the helical element from breaking when the nut is intentionally removed, the free end of the helical element can be bent such that a standard wrench engages it as the nut is torqued off the male thread. This releases the gripping torque and load on the anchoring tang so that the nut can be removed using standard wrenches without damage to the helical locking element. Since the release tang can assume different positions when used with male threads having a range of functional diameter tolerances, a novel release ring is also disclosed which adds utility by allowing the nut and standard wrenches to be used over the full range of male thread functional diameter tolerances.

Despite the advantages of the locking fasteners disclosed in the above referenced applications, a major need exists for locking screws that can be used interchangeably with standard screws. For cost reasons, it is generally preferred to use screws in threaded holes rather than bolts with nuts. There are countless examples of this in a wide variety of industries. For example, surgical fixation plates are commonly attached directly to bone using surgical screws. In automotive and industrial batteries, it is common to attach cables with bolts screwed into holes incorporated in the battery terminals. It is common for these screws or bolts to use polymer locking patches or adhesives to prevent loosening due to cyclic loading and differential thermal expansion due to the combination of materials used in the joints. New bolts are generally used each time an industrial battery cable bolt is removed during battery service. Battery manufacturers instruct users to retighten cable bolts on a regular schedule. Thus, there remains a significant need for a locking screw that can maintain its holding power for extended periods and allow multiple reuse cycles without degradation in performance.

In general, there is a need for internally and externally threaded fasteners that:
  a) allows the use of standard installation and removal tools without the need for special release rings or devices;
  b) provides locking torque equal to or greater than that provided by prevailing torque type locking screws and nuts;
  c) maintains locking torque over multiple reuses;
  d) can be applied to all standardized thread forms;
  e) can be applied to any size screw and nut;
  f) functions over the tolerance ranges for standardized fasteners;
  g) provides substantially greater removal (locking) torque than installation torque (i.e. has continuous one-way torque); and
  h) is manufacturable using mass production equipment.

The above needs are partially satisfied by the fasteners disclosed in the above applications. For example, the helical locking element provides the desired locking torque levels and continuous one-way torque characteristic. However, there remains the need to apply this concept to screws and to eliminate the need for the release tang and release ring yet still provide for high locking torque without risk of breaking the anchor tang on the band when removing the fastener with standard tools.

In addition, the above applications only address nuts using a locking spring made with round wire having a diameter equal to or less than the pitch (lead) of the thread. This allows the coil to have sufficient turns so that it will grip the male thread without slip. Maximum locking torque then is limited to the shear strength of the coil anchor tang. Round wire coils are able to meet the Industrial Fastener Institute standards for prevailing torque type locknuts (IFI-124/524). But, in order to remove the nut without breaking the anchor tang, a release means has to be provided to relieve the force on the anchor tang. A primary need is a way to use the coil locking element in a nut without the need for any release device and to provide sufficient locking torque without risk of breaking the anchor tang on the band during removal.

It is also a need to apply the coil locking method to screws as well as nuts. The release method used on the nuts is not appropriate for use with screws. It is therefore necessary to find a way to use the coil locking element in a screw without the need for any release device.

SUMMARY OF THE INVENTION

The present invention is directed to self-locking, threaded fasteners of enhanced effectiveness and cost efficiency. According to a first aspect of the invention, an internally threaded fastener includes a body and a locking band. The body is adapted to be engaged and driven by a conventional driving tool, and includes a bore having a threaded portion and an unthreaded portion, and an aperture extending radially outward from the unthreaded portion of the bore. The locking band includes a continuously curved portion and a tang extending radially outward from the continuously curved portion. The tang is positionable within the aperture of the unthreaded portion to limit angular movement of the tang with respect to the body. The continuously curved portion terminates at an arcuate end portion within the bore and has a range of radial movement with respect to the fastener body. When the threaded fastener is turned in a loosening direction about an externally threaded member, the locking band compresses against the externally threaded member to inhibit loosening of the threaded fastener.

The locking band can include a rectangular cross section. The threaded portion of the bore can define a pitch, and the locking band can define an axial height greater than the pitch. Alternatively, the locking band can define an axial height less than or equal to the pitch.

The locking band can extend entirely within a first plane. Alternatively, the continuously curved portion of the locking band can be curved helically.

The aperture can define a longitudinal slot, wherein the unthreaded portion of the bore is in communication with the exterior of the body through the longitudinal slot.

According to a second aspect of the invention, an externally threaded fastener includes a head portion, a longitudinal member, and a locking band. The head portion is adapted to be engaged and driven by a conventional driving tool. The longitudinal member defines an externally threaded portion and an unthreaded portion, the unthreaded portion including a radial aperture. The locking band includes a continuously curved portion and a tang extending radially inward from the continuously curved portion, where the tang is positionable within the radial aperture of the unthreaded portion to limit angular movement of the tang with respect to the longitudinal member. The continuously curved portion terminates at an arcuate end portion and has a range of radial movement with respect to the longitudinal member. When the threaded fastener is turned in a loosening direction within an internally threaded member, the locking band expands against the internally threaded member to inhibit loosening of the threaded fastener.

The locking band can include a rectangular cross section. The threaded portion of the longitudinal member can define a pitch, and the locking band can define an axial height greater than the pitch. Alternatively, the locking band can define an axial height less than or equal to the pitch.

The locking band can extend entirely within a first plane. Alternatively, the continuously curved portion of the locking band can be curved helically.

The threaded fastener can include a washer including an inner radial surface having a diameter greater than the diameter of the locking band, where the washer inner radial surface is operable to engage an outer radial surface of the locking band. The washer can also include a radially extending lip extending inwardly to limit movement of the locking band in an axial direction.

These and other advantages and features of the invention will be more fully understood and appreciated by reference to the description of the current embodiments and the drawings.

BRIEF DESCRIPTION OF THE DRAWINGS

FIG. 19 is a perspective view of a third embodiment of an externally threaded fastener.

FIG. 20 is a perspective exploded view of the fastener of FIG. 19.

FIG. 21 is a cross-sectional view of the fastener of FIG. 19.

FIG. 22 is a perspective view of a first variation of the third embodiment of an externally threaded fastener including a locking band having a wire diameter larger than the thread pitch.

FIG. 23 is a perspective exploded view of the fastener of FIG. 22.

FIG. 24 is a cross-sectional view of the fastener of FIG. 23.

DESCRIPTION OF THE CURRENT EMBODIMENTS

I. Internally Threaded Fastener with Locking Band

An internally threaded fastener constructed in accordance with a first aspect of the invention is illustrated in FIGS. 1-12. Though shown in FIGS. 1-12 as a retaining nut, the internally threaded fastener can be any suitable fastener that passes onto an item to be fastened.

A. First Embodiment

Figures 1, 2, 3:
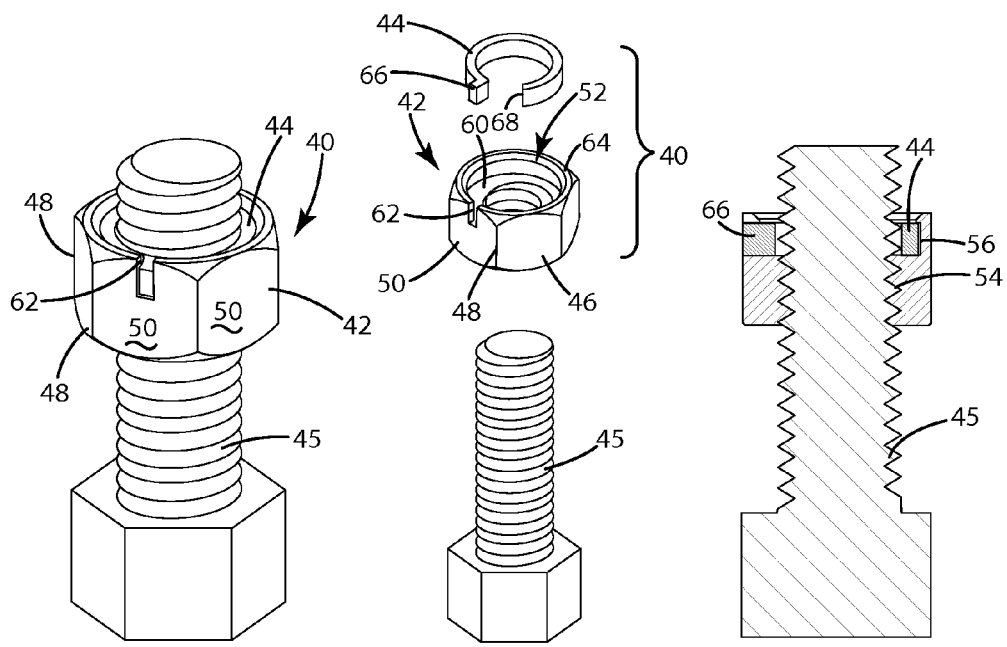
FIG. 1 is a perspective view of a first embodiment of an internally threaded fastener.
FIG. 2 is a perspective exploded view of the fastener of FIG. 1.
FIG. 3 is a cross-sectional view of the fastener of FIG. 1.

An internally threaded fastener constructed in accordance with a first embodiment of this aspect of the invention is illustrated in FIGS. 1-3 and generally designated 40. The threaded fastener 40 includes a body 42 and a locking band 44 used in conjunction with an externally threaded member 45. The body 42 includes a hex-shaped outer portion 46 configured to be engaged and driven by a conventional driving tool (not shown). The hex-shaped portion 46 includes a plurality of corners 48 and a plurality of flats 50 extending therebetween. Alternatively, the body 42 may be square or any other polygonal shape. The body 42 may also be shaped to be engaged by any conventional driving tool, now known or later developed. In addition, the body includes a bore 52, which is at least partially threaded along its length. As perhaps best shown in FIG. 3, the bore 52 includes a first portion 54 that is threaded and a second portion 56 that is unthreaded. The diameter of the unthreaded portion 56 is greater than the diameter of the threaded portion 58. A shoulder 60 separates the first and second portions 56, 58. In addition, a longitudinal slot 62 extends from an axial end portion 64 of the body 42, the slot 62 creating an opening in the unthreaded second portion 56 of the body 42 for receipt of the locking band 44.

The locking band 44 includes a continuously curved element having a rectangular cross-section extending between first and second end portions. The first end portion includes a tang 66 extending radially outward from the locking band 44. Though shown as a single continuous turn, the locking band 44 may instead include two or more helical turns so that adjacent turns are substantially in contact with each other. In addition, the rectangular cross-section defines a longitudinal dimension (i.e., parallel to the thread axis) larger than the pitch of the externally threaded member 45 so that the locking band 44 grips on the major diameter of two or more threads on the externally threaded member 45, rather than being nested within the threads of the threaded member. As shown, the rectangular cross-section defines a radial dimension (i.e., perpendicular to the thread axis) less than the longitudinal dimension, though in other applications the radial dimension may be equal to or greater than the longitudinal dimension.

As noted above, the outwardly extending tang 66 is received within the slot 62 in the fastener body 42. Consequentially, the tang 66 is angularly fixed with respect to the body 42 to prevent relative angular movement therebetween. The second or free end 68 of the locking band 44 lacks a release tang and is free to move angularly within the unthreaded second portion 56 of the body 42. Application of the threaded fastener 40 in a first or generally clock-wise direction onto the externally threaded member 45 operates to expand the locking band 44, so that the locking band 44 does not interfere with or inhibit movement of the threaded fastener 40 onto the externally threaded member 45. However, rotation of the threaded fastener 40 in a second or generally counterclockwise direction operates to draw the locking band 44 securely against the major diameter of two or more threads, whereby the threaded fastener 40 is effectively prevented from undesired loosening. In this regard, the locking band 44 prevents the threaded fastener 40 from rotating in the second direction—typically the loosening direction. The locking band 44 also prevents inadvertent loosening due to vibration.

For example, a threaded fastener 40 can include a ⅜-16 thread size (corresponding to the diameter and threads per inch, respectively), and the locking band 44 can be formed from a 0.1 inch×0.046 inch rectangular steel spring wire having one turn. With an inside diameter of the locking band 44 of 0.345 inches and a coefficient of friction of 0.2, the threaded fastener 40 can provide a locking torque of 13.9 inch-lbs and an installation torque of 4.5 inch-lbs on a Class 2A male thread, with a safety factor of 7.2.

B. Second Embodiment

Figures 4, 5, 6:
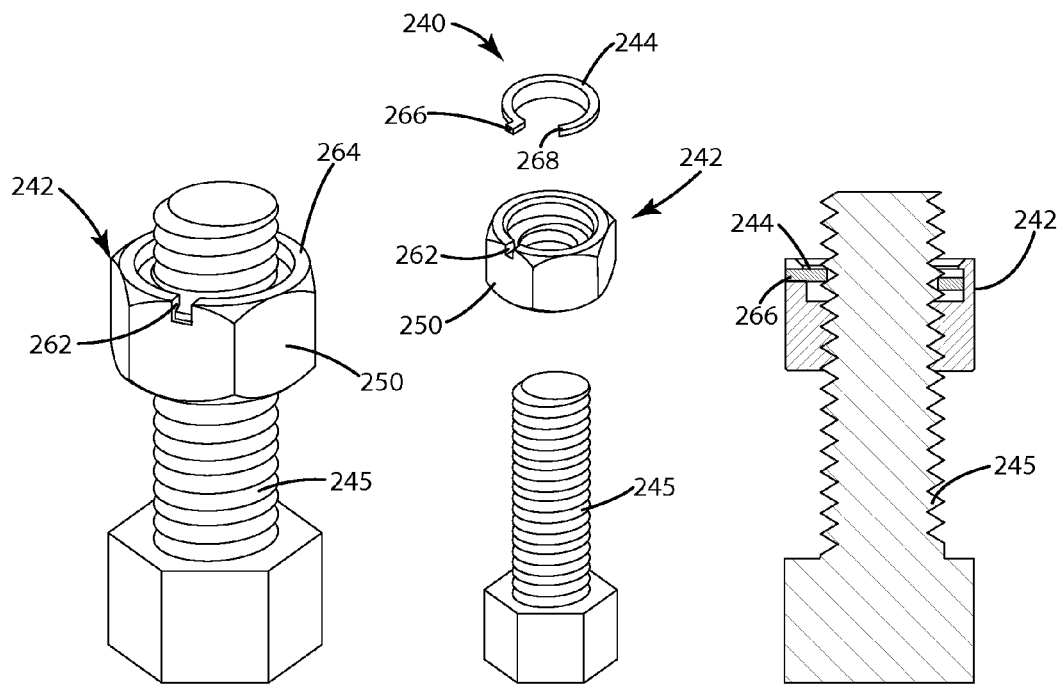
FIG. 4 is a perspective view of a second embodiment of an internally threaded fastener.
FIG. 5 is a perspective exploded view of the fastener of FIG. 4.
FIG. 6 is a cross-sectional view of the fastener of FIG. 4.

A threaded fastener constructed in accordance with a second embodiment of this aspect of the invention is illustrated in FIGS. 4-6 and generally designated 240. The threaded fastener 240 is structurally and functionally similar to the previously described threaded fastener 40. Consequently, each element of the threaded fastener 240 is identified by the same designating numeral as the corresponding element in the threaded fastener 40 with the exception that the numeral begins with a 2. For example, the locking band 244 in the threaded fastener 240 corresponds to the locking band 44 in the threaded fastener 40. Only the elements that differ significantly are described below.

The threaded fastener body 242 is generally similar to the previously described body 42 with the exception that it is physically configured for a different application. In addition, the locking band 244 is generally similar to the previously described locking band 44, in that it includes a continuously curved element having a rectangular cross-section extending between a tang 266 and a free end portion 268. In this embodiment, however, the locking band 244 is dimensioned to nest between the thread crests. That is, the rectangular cross-section defines a longitudinal dimension (i.e., parallel to the thread axis) less than the pitch of the externally threaded member 245 so that the locking band 244 bears against the angled side of adjacent threads of the externally threaded member 45. As shown, the rectangular cross-section defines a radial dimension (i.e., perpendicular to the thread axis) greater than the longitudinal dimension, though in other applications the radial dimension may be equal to or less than the longitudinal dimension.

Operation of the threaded fastener 240 is generally similar to the operation of the previously described threaded fastener 40. The primary difference being that there is an increase in friction over the previously described threaded fastener 40. For example, at a 60° thread angle common to inch and metric threads, the friction force is twice that of the previously described threaded fastener 40. The following example illustrates how this affects locking band 244 construction. Consider a threaded fastener body 242 having a ⅜-16 thread size in combination with a locking band 244 formed from a 0.41 inch×0.080 inch steel spring wire having 0.9 turns and an inside diameter of 0.344 inches. The resulting locking torque can be 31 inch-lbs, with an installation torque of 5 inch-lbs and a safety factor of 2.2 on a Class 2A externally threaded member 245. The counterbore depth for this band is just 0.094 inches, which helps minimize the overall height of the threaded fastener 240. In addition, the locking band 244 can be stamped and formed in a progressive die from strip stock. The tradeoff in this example is that the locking band 244 must be indexed to the thread of the externally threaded member 245, where in the previous embodiment the threaded fastener 240 does not have to be indexed to the thread of the externally threaded member 245.

C. Third Embodiment

Figures 7, 8, 9:
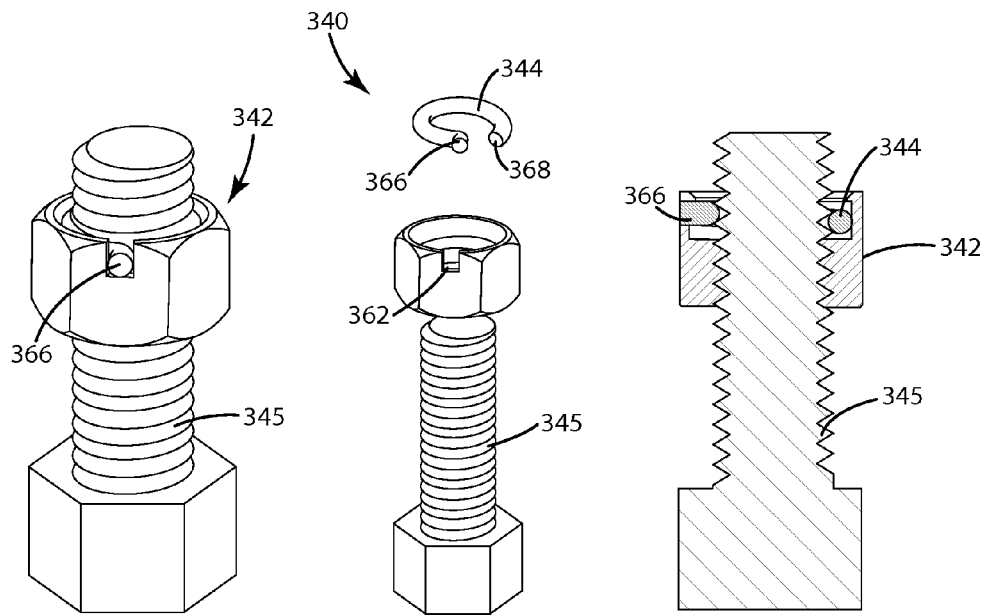
FIG. 7 is a perspective view of a third embodiment of an internally threaded fastener.
FIG. 8 is a perspective exploded view of the fastener of FIG. 7.
FIG. 9 is a cross-sectional view of the fastener of FIG. 7.

A threaded fastener constructed in accordance with a third embodiment of this aspect of the invention is illustrated in FIGS. 7-9 and generally designated 340. The threaded fastener 340 is structurally and functionally similar to the previously described threaded fastener 40. Consequently, each element of the threaded fastener 340 is identified by the same designating numeral as the corresponding element in the threaded fastener 40 with the exception that the numeral begins with a 3. For example, the locking band 344 in the threaded fastener 340 corresponds to the locking band 44 in the threaded fastener 40. Only the elements that differ significantly are described below.

The threaded fastener body 342 is generally similar to the previously described body 42 with the exception that it is physically configured for a different application. The locking band 344 is generally similar to the previously described locking band 44, in that it includes a continuously curved element extending between a tang 366 and a free end portion 368. In this embodiment, however, the locking band 344 includes a circular cross-section having a diameter equal to or greater than the thread pitch. In this embodiment, the locking band 344 bears against the angled side of adjacent threads of the externally threaded member 345, or against the major diameter of two or more threads on the externally threaded member 345. Optionally, the locking band 344 in this embodiment includes less than one full turn.

Operation of the threaded fastener 340 is generally similar to the operation of the previously described threaded fastener 40. In addition, the locking band 244 diameter can be selected to provide the necessary strength and eliminate or reduce the need for a release tang (not shown). In this configuration, for example, a threaded fastener body 342 includes a ⅜-16 thread size in combination with a locking band 344 formed from a 0.085 inch diameter steel wire having 0.9 turns and an inside diameter of 0.330 inches. The resulting locking torque can be 22 inch-lbs on a Class 2A externally threaded member 345 and a safety factor of 3.6.

D. Fourth Embodiment

Figures 10, 11, 12:
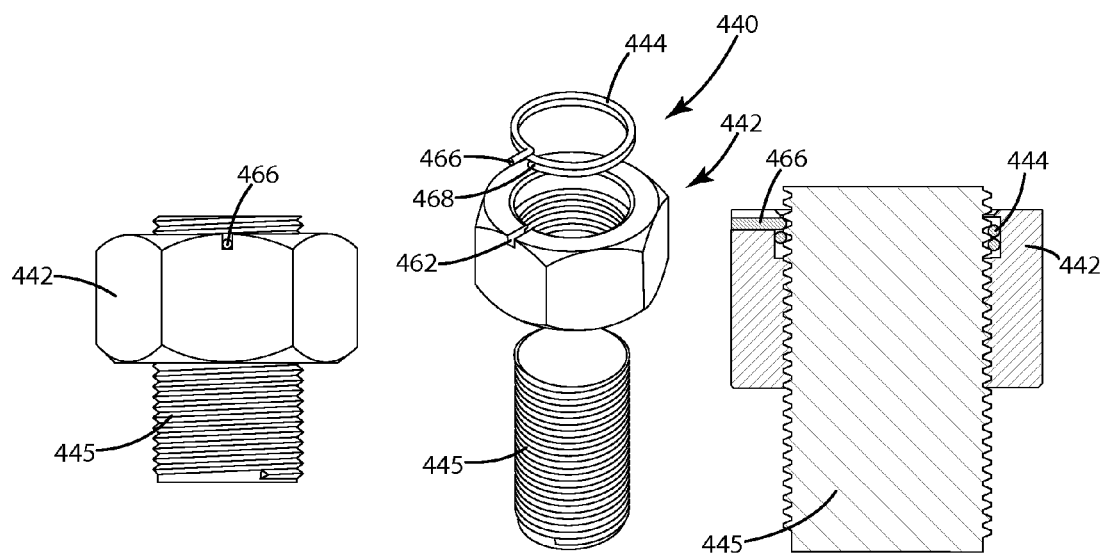
FIG. 10 is a side view of a fourth embodiment of an internally threaded fastener.
FIG. 11 is a perspective exploded view of the fastener of FIG. 10.
FIG. 12 is a cross-sectional view of the fastener of FIG. 10.

A threaded fastener constructed in accordance with a fourth embodiment of this aspect of the invention is illustrated in FIGS. 10-12 and generally designated 440. The threaded fastener 440 is structurally and functionally similar to the previously described threaded fastener 40. Consequently, each element of the threaded fastener 440 is identified by the same designating numeral as the corresponding element in the threaded fastener 40 with the exception that the numeral begins with a 4. For example, the locking band 444 in the threaded fastener 440 corresponds to the locking band 44 in the threaded fastener 40. Only the elements that differ significantly are described below.

The threaded fastener body 442 is generally similar to the previously described body 42 with the exception that it is physically configured for a different application. The locking band 444 is generally similar to the previously described locking band 44, in that it includes a continuously curved element extending between a tang 466 and a free end portion 468. In this embodiment, however, the locking band 444 includes multiple turns having a circular cross-section having a diameter equal to or slightly less than the thread pitch. In this embodiment, the locking band 444 bears against the angled side of adjacent threads of the externally threaded member 445.

Operation of the threaded fastener 440 is generally similar to the operation of the previously described threaded fastener 40. The present embodiment is perhaps best suited for applications where less locking torque is required, and where is it acceptable to remove the threaded fastener 440 by simply overriding the locking torque with a standard wrench. This embodiment is especially appropriate for use with a plastic threaded fastener body 442 using a metal locking band 444. Low manufacturing costs can be maintained because the threaded fastener threads are molded and consistently indexed so the round wire locking band 444 can be snapped into place easily using automated equipment. In addition, round wire bands are low in cost and easily manufactured in high quantities, making this configuration a useful, low cost option where strength requirements allow. This method is not limited, however, to plastic threaded fasteners. There could be applications for metal threaded fasteners with torque requirements suitable for this embodiment.

II. Externally Threaded Fastener with Locking Band

An externally threaded fastener constructed in accordance with a second aspect of the invention is illustrated in FIGS. 13-30. Though shown in FIGS. 13-30 as a threaded screw or bolt, the externally threaded fastener can include any suitable fastener which passes through an item to be fastened.

A. First Embodiment

An externally threaded fastener constructed in accordance with a first embodiment of this aspect of the invention is illustrated in FIGS. 13-16 and generally designated 1140. The threaded fastener 1140 includes a screw 1142 and a locking band 1144. The screw 1142 includes a head portion 1146, a neck portion 1148 and a threaded body portion 1150. The head portion 1146 can include a frusto-conical portion 1152 terminating at a flat upper surface 1154. The upper surface 1154 can include a hexagonal recess 1156 to receive a suitable insertion tool. Though not shown, the head portion 1146 can alternatively include any suitable mating surface for use in conjunction with an insertion tool now known or later developed. For example, the head portion 1146 can include a hexagonal head which can be engaged by a suitable insertion tool such as a wrench.

As also shown in FIGS. 13-16, the screw 1142 includes a neck portion 1148 extending downwardly from the head portion 1146, being generally disposed between the head portion 1146 and the threaded body portion 1150. The neck portion 1158 includes an annular recess 1160 about its external radial surface for receipt of the locking band 1144. In addition, the neck portion 1156 includes an outward or radially extending lip 1162 for retaining the locking 1144 band in the annular recess 1160. The recess 1160 can further include an inwardly extending slot 1164 for receipt of a locking band tang as discussed in more detail below.

Figure 13:
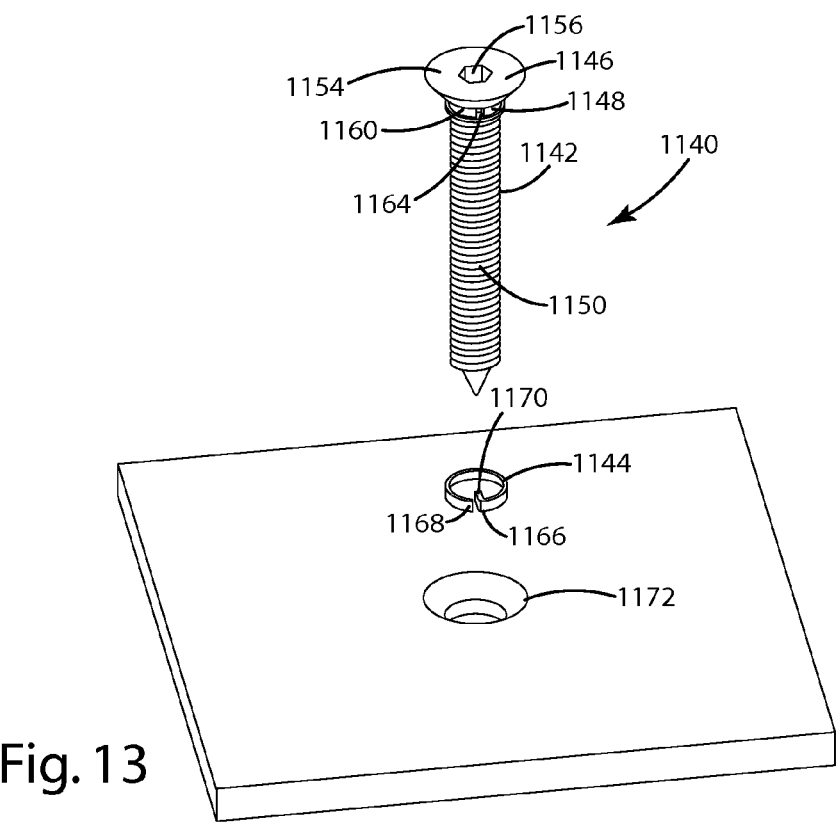
FIG. 13 is a perspective exploded view of a first embodiment of an externally threaded fastener.
Figure 14:
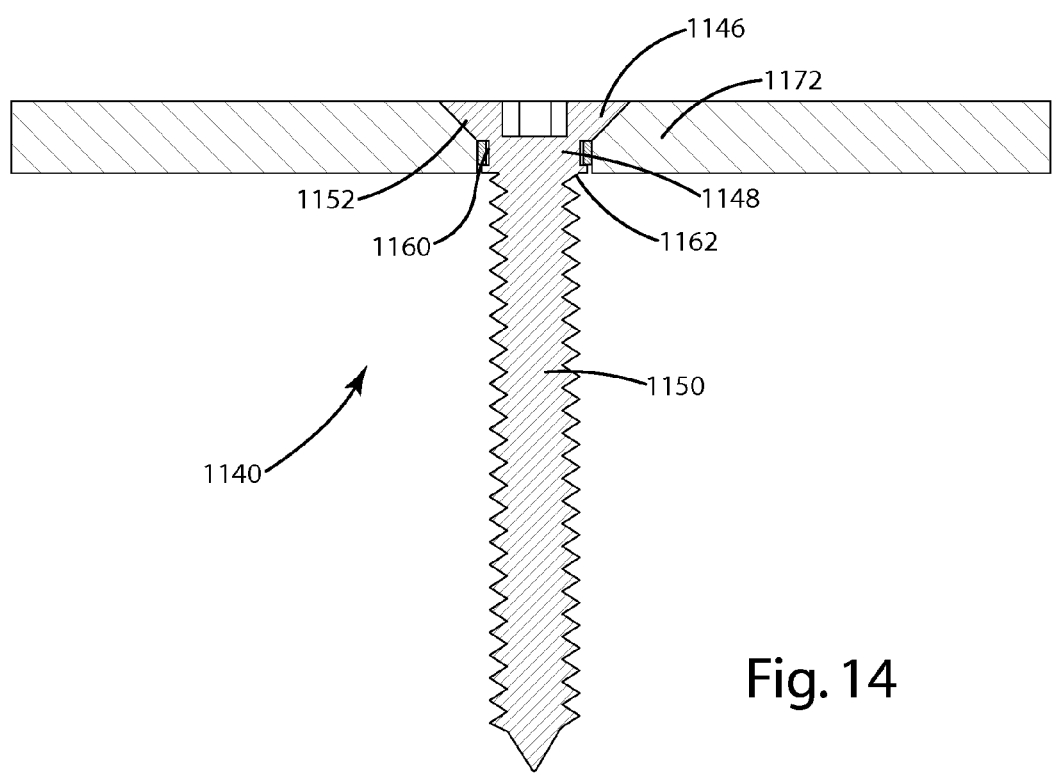
FIG. 14 is a cross-sectional view of the fastener of FIG. 13.
Figure 15:
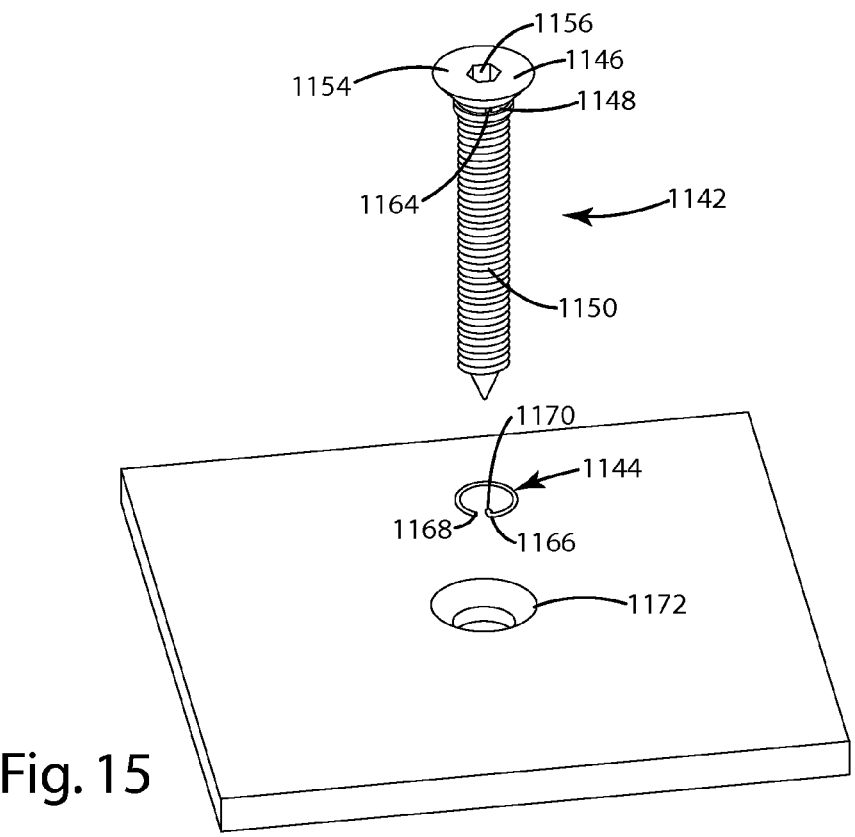
FIG. 15 is a perspective exploded view of a variation of the first embodiment of an externally threaded fastener including a locking band having a circular cross-section.
Figure 16:
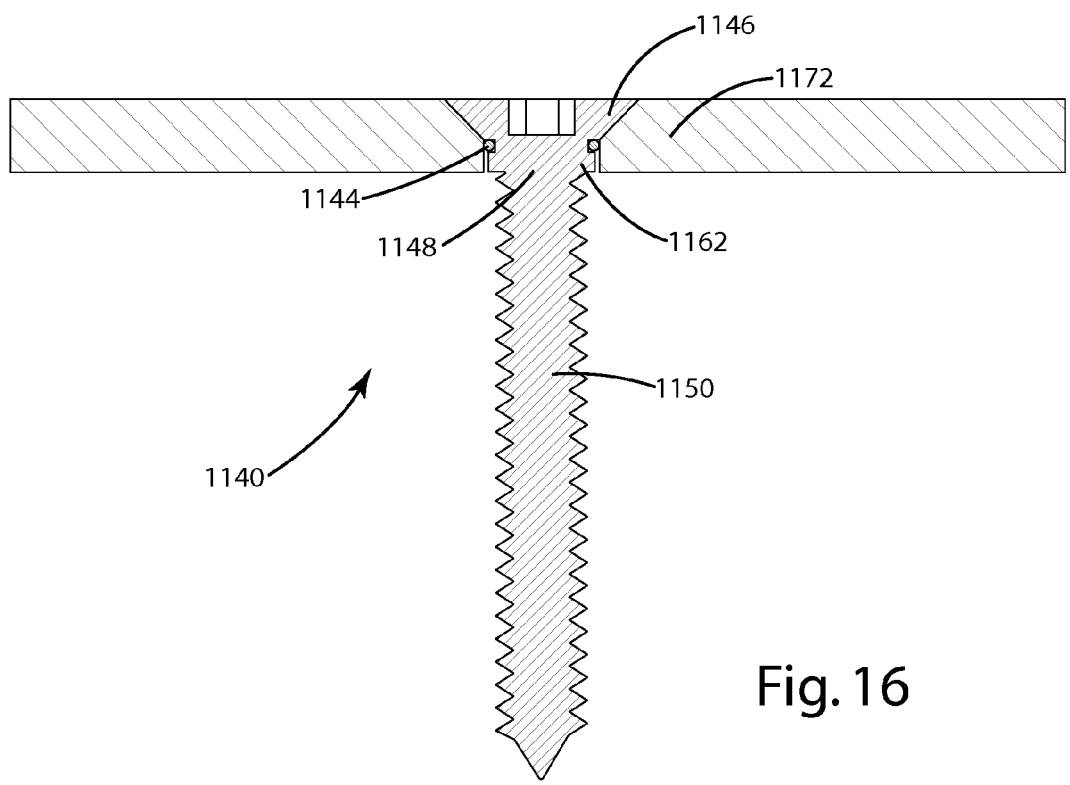
FIG. 16 is a cross-sectional view of the fastener of FIG. 15.

As best shown in FIGS. 13 and 15, the locking band 1144 includes a continuously curved element having a rectangular or circular cross-section extending between first and second end portions 1166, 1168. The first end portion 1166 includes a tang 1170 extending radially inward from the locking band 1144. The second end portion 1168 lacks a release tang and is free to move angularly within the annular recess 1160. In addition, the rectangular cross-section as shown in FIGS. 13-14 defines a longitudinal dimension (i.e., parallel to the thread axis) slightly less than the width of the annular recess 1160 and a radial dimension (i.e., perpendicular to the thread axis) slightly less than the depth of the annular recess 1160 to permit the locking band 1144 to be snugly received within the annular recess 1160. As alternatively shown in FIGS. 15-16, the locking band 1144 includes a circular cross-section having a diameter slightly less than the width of the annular recess 1160 and slightly less than the depth of the annular recess 1160 to permit the locking band 1144 to be snugly received within the annular recess 1160.

With further reference to FIGS. 13-15, the tang 1170 is angularly fixed with respect to the screw 1142 to prevent angular movement therebetween. The second or free end 1168 lacks a release tang and is free to move angularly within the annular recess 1160. Application of the retaining fastener 1140 in a first or generally clockwise direction into an aperture 1172 operates to compress the locking band 1144 within the annular recess 1160, so that the locking band 1144 does not interfere with or inhibit movement of the threaded fastener 1140 in the aperture 1172. However, rotation of the threaded fastener 1140 in the second or generally counter-clockwise direction operates to expand the locking band 1144 into contact with the inner radial surface of the aperture 1172. That is, friction between the locking band 1144 and the inner radial surface of the aperture 1172 causes the locking band 1144 to expand, which increases the pressure between the locking band 1144 and the inner radial surface of the aperture 1172, further increasing friction. As a result, the locking band 1144 provides a locking torque to prevent the screw 1142 from loosening relative to the aperture 1172. Though not shown, the screw 1142 can extend through a washer adjacent the planar surface 1174. The added friction from the washer against the planar surface 1174 operates to transmit the locking torque to the screw-surface interface.

It should be noted that installation of the locking band 1144 can be accomplished in a number of ways. For example, the locking band 1144 can be wound in place, or the locking band 1144 can be expanded and snapped into place. In addition, the neck portion 1148 can be undercut to provide room for the locking band 1144 to compress when the screw 1142 is installed. In other words, the neck portion 1148 can include an outer radius less than the inner radius of the locking band 1144 in an uncompressed state. In one example, the screw 1142 includes a 0.25 inch diameter, and the locking band 1144 formed of hard drawn stainless steel wire includes a 0.04 inch diameter cross-section and a 0.31 inch outer diameter having 0.9 turns. When installed in a 0.29 inch diameter aperture countersunk to 0.313 inches, the locking torque can be 5 inch-lbs, the installation torque can be 1.8 inch-lbs, and the safety factor can be 2.4. The retaining fastener 1140 can further provide 5 inch-lbs of locking torque over multiple removal cycles. In this example, the locking band 1144 is sized so that if it were to shear the anchor tang 1170 upon removal of the screw 1142 from the countersunk aperture 1172, the locking band 1144 would remain captured within the screw annular recess 1160.

B. Second Embodiment

Figure 17:
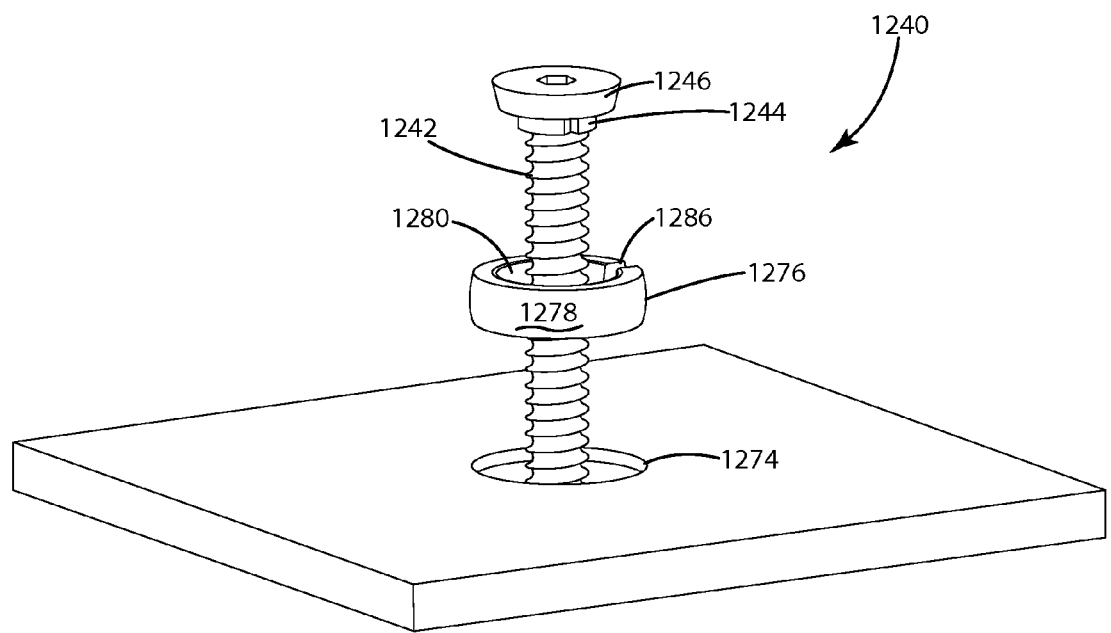
FIG. 17 is a perspective exploded view of a second embodiment of an externally threaded fastener.
Figure 18:
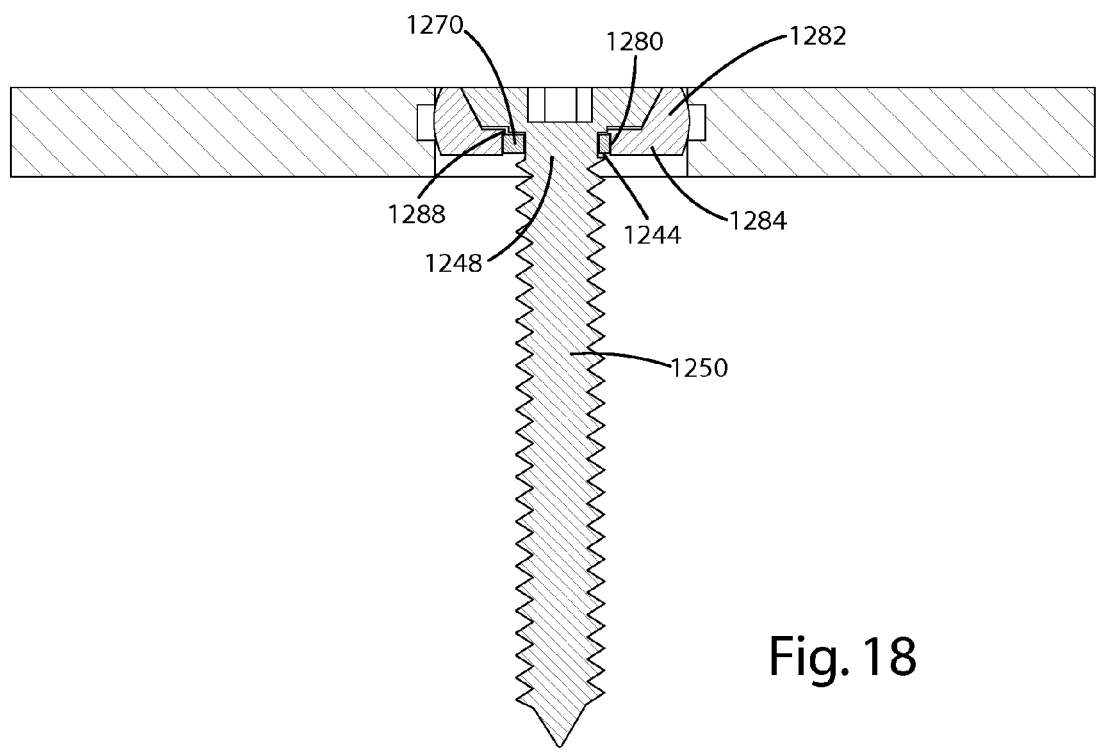
FIG. 18 is a cross-sectional view of the fastener of FIG. 17.

A threaded fastener constructed in accordance with a second embodiment of this aspect of the invention is illustrated in FIGS. 17-18 and generally designated 1240. The threaded fastener 1240 is structurally and functionally similar to the previously described threaded fastener 1140. Consequently, each element of the threaded fastener 1240 is identified by the same designating numeral as the corresponding element in the threaded fastener 1140 with the exception that the numeral begins with a 12. For example, the screw 1242 and the locking band 1244 correspond to the screw 1142 in the locking band 1144. Only the elements that differ significantly are described below.

The screw 1242 and locking band 1244 are generally similar to the previously described screw 1142 and locking band 1144 with the exception that they are physically configured for a different application. In this embodiment, however, the threaded fastener 1240 includes a "split" spherical washer 1276 for placement into a corresponding aperture 1274. The spherical washer 1276 can include a frusto-spherical outer surface 1278 and a stepped or countersunk interior surface 1280 for forming a generally "L" shaped cross-section. In particular, the interior surface 1280 includes an upper axially-extending portion 1282 and a lower radially-extending portion 1284 which, in combination, generally conform to the frusto-conical shape of the screw head 1246. The lower radial portion 1284 further includes a radial lip 1288 to prevent axial movement of the locking band 1244 in at least one axial direction. The spherical washer 1276 can further include a vertical groove or notch 1286 extending in an axial direction partially or completely through the spherical washer 1276 to permit the spherical washer 1276 to contract when under a load. In addition, the radially extending portion 1284 includes an inner radial surface having a diameter slightly less than the outer diameter of the locking band 1244 in an uncompressed state, wherein the washer inner radial surface is operable to engage the outer radial surface of the locking band 1244 and slightly compress the locking band 1244.

Operation of the threaded fastener 1240 is generally similar to the operation of the previously described threaded fastener 1140. In addition, the threaded fastener 1240 described above is particularly well suited for surgical applications where angular adjustments are needed to achieve optimum strength. For example, the above spherical washer 1276 can be rotated in the aperture 1274 to provide the needed adjustment for optimum positioning of the threaded fastener 1240. When the screw 1242 is tightened, the split spherical washer 1276 expands and locks at the desired installation angle. At the same time, the lipped interior surface 1280 of the spherical washer 1276 allows the locking band 1244 to compress sufficiently to pass by the reduced diameter lip 1288 and then expand under the lip 1288 so that it can grip the inner radial surface of the lower radial portion 1284. In this position, the locking band 1244 now inhibits the screw 1242 from moving axially away from the plate 1274 and also resists rotational loosening as described above in connection with the first embodiment. This embodiment can be utilized with surgical screws having suitable threads for installation in either or both of cortical and cancellous bone.

C. Third Embodiment

A threaded fastener constructed in accordance with a third embodiment of this aspect of the invention is illustrated in FIGS. 19-30 and generally designated 1340. The threaded fastener 1340 is structurally and functionally similar to the previously described threaded fastener 1140. Consequently, each element of the threaded fastener 1340 is identified by the same designating numeral as the corresponding element in the threaded fastener 1140 with the exception that the numeral begins with a 13. For example, the screw 1342 and the locking band 1344 correspond to the screw 1142 in the locking band 1144. Only the elements that differ significantly are described below.

The screw 1342 and locking band 1344 are generally similar to the previously described screw 1142 and locking band 1144 with the exception that they are physically configured for a different application. In addition, the threaded body 1350 now includes a first threaded portion 1351, an unthreaded portion 1353, and a second threaded portion 1355, though not necessarily in that order. The first threaded portion 1351 generally extends downwardly or longitudinally from the head portion 1346 and/or the optional neck portion 1348. The first threaded portion 1351 terminates at the unthreaded portion 1353. The unthreaded portion 1353 can include an outer diameter less than the outer diameter of the adjacent first threaded portion 1351. In addition, the unthreaded portion 1353 can include an axial dimension greater than the spacing 1357 between adjacent turns of a thread 1359, and optionally greater than the spacing between three or more turns of a thread 1359.

Though described above as unthreaded, the unthreaded portion 1353 can include a contoured surface 1361, including, for example, bumps or undulations to increase the roughness of this portion of the threaded body 1350. The unthreaded portion 1353 terminates in the second threaded portion 1355. The second threaded portion 1355 can be indexed to correspond with the thread on the first threaded portion 1351, such that the screw body 1350 forms an otherwise continuously threaded member having threadless gap 1353 along a portion of its length. Though shown as being located distal from the head portion 1346, the unthreaded portion 1353 can instead be proximate to or adjacent the head portion 1346.

Figure 25:
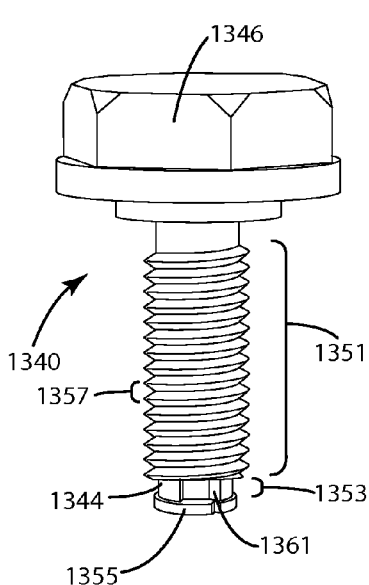
FIG. 25 is a perspective view of a second variation of the third embodiment of an internally threaded fastener including a rectangular locking band having a band height greater than the thread pitch.
Figure 26:
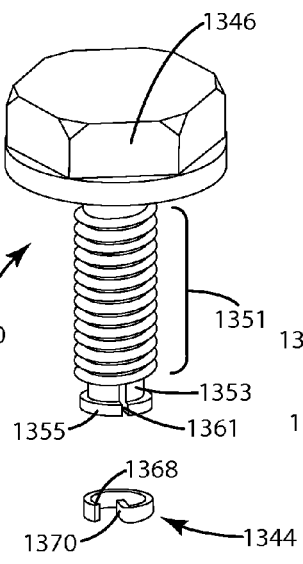
FIG. 26 is a perspective exploded view of the fastener of FIG. 25.
Figure 27:
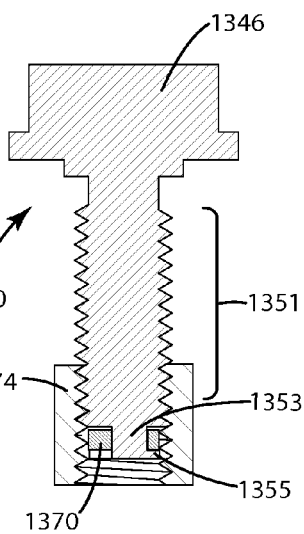
FIG. 27 is a cross-sectional view of the fastener of FIG. 25.
Figure 28:
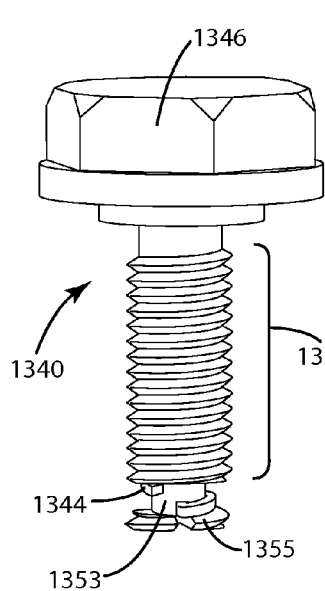
FIG. 28 is a perspective view of a third variation of the third embodiment of an internally threaded fastener including a rectangular locking band having a band height less than the thread pitch.
Figure 29:
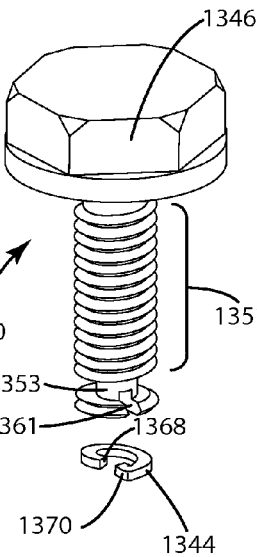
FIG. 29 is a perspective exploded view of the fastener of FIG. 28.
Figure 30:
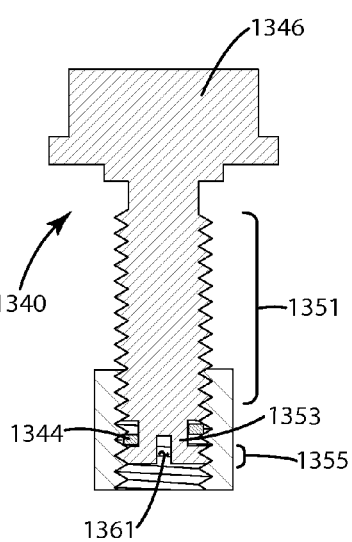
FIG. 30 is a cross-sectional view of the fastener of FIG. 28.

The unthreaded portion 1353 further includes an inwardly or radially extending slot 1361 shaped to receive a tang of a corresponding locking band 1344. For example, if as shown in FIGS. 19-24 the locking band 1344 includes a circular cross-section, the inwardly extending slot 1361 can include a cylindrically-shaped recess 1361 to receive the inwardly extending tang of the locking band 1344. If, however, the locking band 1344 includes a rectangular cross section as shown in FIGS. 25-30, the inwardly extending slot 1361 can include a rectangularly-shaped recess 1361 to receive the inwardly extending tang of the locking band 1344. In addition, the inwardly extending slot 1361 can extend longitudinally from the unthreaded portion 1353 through all or a portion of the second threaded portion 1355 as shown in FIGS. 25-30. In addition, the second threaded portion can instead form a radial lip 1355 having an outer diameter less than the thread diameter for limiting axial movement of the locking band 1344 as shown in FIGS. 25-27.

The pitch, size, cross-section and other aspects of the locking band 1344 can vary from application to application as desired. For example, FIGS. 19-21 illustrate a continuously curved element having a circular cross-section extending between first and second end portions. The first end portion includes a tang 1366 extending radially inward from the locking band 1344. Though shown as a single continuous turn, the locking band 1344 may instead include two or more helical turns so that adjacent turns are substantially in contact with each other. In addition, the circular cross-section defines a diameter equal to or less than the pitch of the screw body— and therefore equal to or less than the pitch of the internally threaded mating member 1374—so that the locking band 1344 is nested between adjacent threads of the internally threaded member 1374. As alternatively shown in FIGS. 22-24, the circular cross-section can define a diameter greater than the pitch of screw body—and therefore greater than the pitch of the internally threaded member 1374—so that the locking band 1344 bears against the angled side of adjacent threads of the internally threaded member 1374, or against the major diameter of two or more threads on the internally threaded member 1374.

Though described above as having a circular cross-section, the locking band 1344 can alternatively include a rectangular cross-section. For example, as shown in FIGS. 25-27, the rectangular cross-section defines a longitudinal dimension (i.e., parallel to the thread axis) larger than the pitch of the internally threaded member 1374 so that the locking band 1344 grips on the major diameter of two or more threads on the internally threaded member 1374, rather than being nested within the threads of the internally threaded member 1374. As shown, the rectangular cross-section defines a radial dimension (i.e., perpendicular to the thread axis) less than the longitudinal dimension, though in other applications the radial dimension may be equal to or greater than the longitudinal dimension. As alternatively shown in FIGS. 28-30, the locking band 1344 can be dimensioned to nest between the thread crests. That is, the rectangular cross-section can define a longitudinal dimension (i.e., parallel to the thread axis) less than the pitch of the internally threaded member 1374 so that the locking band 1344 bears against the angled side of adjacent threads of the internally threaded member 1344. As shown, the rectangular cross-section defines a radial dimension (i.e., perpendicular to the thread axis) greater than the longitudinal dimension, though in other applications the radial dimension may be equal to or less than the longitudinal dimension.

As noted above, the locking band 1344 includes an inwardly extending tang 1370 received within the radial slot 1361 in the unthreaded portion 1353 of the screw 1342. Consequentially, the tang 1370 is angularly fixed with respect to the screw 1342 to prevent angular movement therebetween. The second or free end 1368 lacks a release tang and is free to move angularly about the unthreaded portion 1353 of the screw 1342. Application of the retaining fastener 1140 in a first or generally clockwise direction into internally threaded member 1374 operates to compress the locking band 1344, so that the locking band 1344 does not interfere with or inhibit movement of the threaded fastener 1340 in the internally threaded member 1374. However, rotation of the threaded fastener 1340 in the second or generally counter-clockwise direction operates to expand the locking band 1344 into contact with one or more threads of the internally threaded member 1374. That is, friction between the locking band 1344 and the threads of the internally threaded member 1374 causes the locking band 1344 to expand, which increases the pressure between the locking band 1344 and the internally threaded member 1374, further increasing friction. As a result, the locking band 1344 provides a locking torque to prevent the screw 1342 from loosening relative to the internally threaded member 1374.

In one example, the threaded fastener of FIGS. 19-21 includes a ¼-20 thread size and a locking band formed of a 0.031 inch diameter steel spring wire with an initial outside diameter of 0.244 inches and one turn after installation in a Class 2B threaded aperture. Assuming a 0.2 coefficient of friction between the locking band and the internally threaded aperture, the resulting removal torque can be 5 inch-lbs, the resulting installation torque can be 0.6 inch-lbs, and the resulting safety factor can be 1.8.

The threaded fastener of the present invention may also be utilized in applications where removal of the fastener is not anticipated or where the fastener can be disposed of upon removal. In these instances, maximum removal torque can be achieved by designing the locking band to have a factor of safety of unity. Under these conditions, the locking band, and in particular the locking band tang, is configured to fracture upon removal. There is little or no risk that a portion of the locking band will remain in the internally threaded aperture, as the locking band and the fractured anchor tang will normally remain captured on the screw as it is removed, rendering the threaded aperture reusable. In surgical settings, for example, there is little to no risk that a portion of a locking band will left behind in a patient upon removal of the threaded fastener.

Installation of the locking band can be accomplished in a number of ways. For example, the locking band 1344 can be wound in place, or it can be expanded and snapped into place, or the end of the screw 1342 can be slotted to minimize the amount of expansion. The above embodiments can meet the objective for a locking screw which is a direct replacement for standard screws used in threaded holes. The above embodiments can also be ideal for use with battery cables, as well as countless other applications across all industries using screws in demanding environments.

It should also be noted that the resulting locking torque can be a function of a number of variables, including initial diameter of the locking band, the material properties of the locking band, the coefficient of friction of the locking band and the number of turns of the locking band. In addition, parameter tolerances will affect the range of locking torque for a particular configuration. Parameters for the locking band can therefore be selected for each screw size and tolerance range to allow the slip torque to be less than the ultimate strength of the locking band while still providing an acceptable locking torque range. In addition, the locking torque can be set to meet or to exceed relevant Industrial Fastener Institute standards, IFI-123 and IFI-524, which set forth the standards for installation and removal prevailing torque for inch and metric screws. One difference between standard prevailing torque screws and the locking band screws of the present invention is that the locking band screws of the present invention include a one-way prevailing torque. Installation torque can be very low (much less than the maximum allowed by IFI standards) when compared to standard prevailing torque screws. In addition, the locking band screw removal prevailing torque is less subject to degradation over multiple uses when compared to a typical torque screw.

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A locking threaded fastener comprising:
   a fastener body adapted to be engaged and driven by a conventional driving tool, the body defining a bore including a threaded portion having a threaded diameter, an unthreaded portion having an unthreaded diameter greater than the threaded diameter, and an integral shoulder portion having a shoulder diameter greater than the threaded diameter and less than the unthreaded diameter, the threaded portion of the bore defining a pitch, the body further defining a radially oriented aperture communicating with the unthreaded portion; and
   a locking band having a rectangular cross-section and including a curved portion and a tang extending radially from the curved portion, the locking band located within the unthreaded portion with the tang extending into the aperture to limit angular movement of the tang with respect to the body, the locking band retained within the unthreaded portion by the shoulder portion, a turn of the locking band defining a cross-section having an axial height greater than the pitch.

2. The locking threaded fastener of claim 1 wherein the curved portion comprises a helical portion.

3. The locking fastener of claim 1 wherein the aperture comprises a longitudinal slot extending through the shoulder portion and the unthreaded portion, the unthreaded portion of the bore being in communication with the exterior of the body through the longitudinal slot.

4. A locking threaded fastener comprising:
   a fastener body adapted to be engaged and driven by a conventional driving tool, the body defining a bore including a threaded portion having a threaded diameter, an unthreaded portion having an unthreaded diameter greater than the threaded diameter, and an integral shoulder portion having a shoulder diameter greater than the threaded diameter and less than the unthreaded diameter, the threaded portion of the bore defining a pitch, the body further defining a radially oriented aperture communicating with the unthreaded portion; and a locking band including a curved portion within the bore and a tang extending radially from the curved portion and into the aperture, the curved portion of the locking band including a terminal end portion as a continuation of the curved portion, the end portion having a range of radial movement with respect to the fastener body, a turn of the locking band defining a cross-section having an axial height greater than the pitch, the locking band retained within the unthreaded portion by the shoulder portion.

5. The locking threaded fastener of claim 4 wherein the curved portion comprises a helical portion.

6. The locking fastener of claim 4 wherein the aperture comprises a longitudinal slot extending through the shoulder portion and the unthreaded portion, the unthreaded portion of the bore being in communication with the exterior of the body through the longitudinal slot.

7. A locking threaded fastener comprising:
a fastener body adapted to be engaged and driven by a conventional driving tool, the body defining a bore including a threaded portion having a threaded diameter, an unthreaded portion having an unthreaded diameter greater than the threaded diameter, and an integral shoulder portion having a shoulder diameter greater than the threaded diameter and less than the unthreaded diameter, the body further defining a radially oriented aperture communicating with the unthreaded portion; and
a locking band having a rectangular cross-section and including a curved portion and a tang extending radially from the curved portion, the locking band located within the unthreaded portion with the tang extending into the aperture to limit angular movement of the tang with respect to the body, the locking band extending entirely within a first plane, the locking band retained within the unthreaded portion by the shoulder portion.

8. The locking fastener of claim 7 wherein the aperture comprises a longitudinal slot extending through the shoulder portion and the unthreaded portion, the unthreaded portion of the bore being in communication with the exterior of the body through the longitudinal slot.

9. A locking threaded fastener comprising:
a fastener body adapted to be engaged and driven by a conventional driving tool, the body defining a bore including a threaded portion having a threaded diameter, an unthreaded portion having an unthreaded diameter greater than the threaded diameter, and an integral shoulder portion having a shoulder diameter greater than the threaded diameter and less than the unthreaded diameter, the body further defining a radially oriented aperture communicating with the unthreaded portion; and
a locking band including a curved portion within the bore and a tang extending radially from the curved portion and into the aperture, the curved portion of the locking band including a terminal end portion as a continuation of the curved portion, the end portion having a range of radial movement with respect to the fastener body, the locking band extending entirely within a first plane, the locking band retained within the unthreaded portion by the shoulder portion.

10. The locking fastener of claim 9 wherein the aperture comprises a longitudinal slot extending through the shoulder portion and the unthreaded portion, the unthreaded portion of the bore being in communication with the exterior of the body through the longitudinal slot.

* * * * *